United States Patent [19]
Jalla

[11] Patent Number: 6,085,482
[45] Date of Patent: *Jul. 11, 2000

[54] CONSTRUCTING AND ANALYZING REQUIREMENTS OF TRUSS SPLICE SHOE

[76] Inventor: Maharaj K. Jalla, 7817 Calpurnia Ct., Mclean, Va. 22102

[*] Notice: This patent issued on a continued prosecution application filed under 37 CFR 1.53(d), and is subject to the twenty year patent term provisions of 35 U.S.C. 154(a)(2).

[21] Appl. No.: 08/834,140

[22] Filed: Apr. 14, 1997

Related U.S. Application Data

[63] Continuation-in-part of application No. 08/706,469, Sep. 3, 1996, abandoned.

[51] Int. Cl.[7] ............................................... F16B 9/00
[52] U.S. Cl. .............................. 52/702; 52/704; 52/712; 403/232.1
[58] Field of Search .................................. 52/712, 726.2, 52/DIG. 6, 690–697, 639, 702, 704; 403/232.1, 283, 237, 405.1, 407.1; 411/466–468

[56] References Cited

U.S. PATENT DOCUMENTS

| | | | |
|---|---|---|---|
| 3,601,428 | 8/1971 | Gilb | 403/232.1 |
| 3,731,583 | 5/1973 | Jureit | 52/712 X |
| 4,330,971 | 5/1982 | Auberger | 403/232.1 X |
| 4,738,071 | 4/1988 | Ezard | 52/741.1 |
| 4,920,725 | 5/1990 | Gore | 52/702 |
| 5,104,252 | 4/1992 | Colonias | 403/232.1 |
| 5,111,632 | 5/1992 | Turner | 52/702 |

*Primary Examiner*—Beth A. Aubrey

[57] ABSTRACT

The present invention relates to a truss splice shoe hat can be used to assemble members of lumber roof trusses of residential buildings. The truss splice shoe is a U-shaped plate made of steel, with unitary prongs formed in the sidewalls used as fastening means to truss members. Each unitary prong has an elongated, curved portion tapering to a penetrating end. After arranging the truss members in the desired configuration, only a single truss splice shoe needs to be installed to form a strong joint with ease and with minimum of labor. The truss splice shoe can also be used to repair a distressed truss member or to provide a joint in a truss member.

2 Claims, 5 Drawing Sheets

CONSTRUCTING AND ANALYZING REQUIREMENTS OF TRUSS SPLICE SHOE

RELATED APPLICATION

This application is a continuation-in-part of U.S. patent application Ser. No. 08/706,469 filed on Sep. 3, 1996, now abandoned.

INTRODUCTION

The present invention relates to a new piece of hardware for assembling lumber roof trusses of residential buildings.

In current practice, a lumber roof truss is assembled with plates which are available in different shapes and sizes. Before use, these plates are either drilled for nailing holes, or are punched so that the plate metal itself can be driven into wood. Moreover, a separate plate is attached on each side of every truss connection.

The primary object of the present invention is to provide an alternative hardware for assembling a roof truss that is mountable with a minimum of labor, and productive of a strong joint.

The invented hardware is a truss splice shoe which is a U-shaped plate made of steel or any other suitable metal, with unitary prongs used as fastening means to lumber roof truss members. When a single truss splice shoe is placed in position at a truss connection, it ties together several truss members meeting at the connection. The truss splice shoe can also be used for carrying out repair of a distressed truss member, or for providing a joint in a truss member.

BRIEF DESCRIPTION OF THE FIGURES

The present invention will be more readily understood by reference to the following description when read in conjunction with the attached drawings.

DETAILED DESCRIPTION

In current practice, a lumber roof truss is assembled using plates which are available in different shapes and sizes. Some plates are attached with nails and some have struck-out projections so that the plate metal itself drives into the wood. As a separate plate is attached on each side of every truss connection, a lot of labor is involved.

The present invention discloses a new piece of hardware known as truss splice shoe that can be used to efficiently connect truss members at joints. The truss splice shoe is a U-shaped plate having a bottom wall and two substantially parallel sidewalls, and is made of steel or any other suitable material that is stronger than lumber. As a single truss splice shoe is used at any connection, it leads to savings in time and effort. The truss splice shoe can also be used to repair a distressed truss member or to provide a joint in a truss member.

Figure 1:
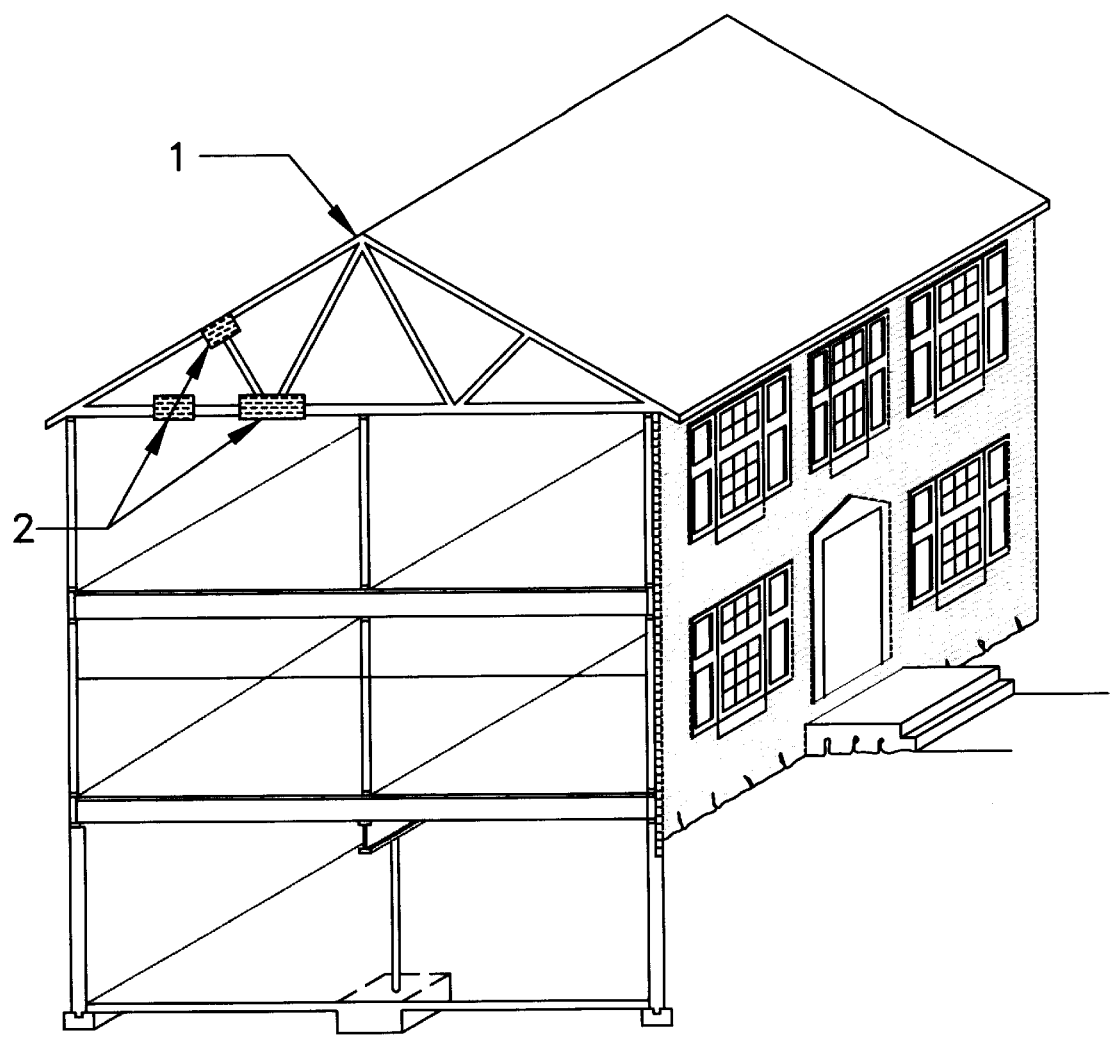
FIG. 1 is an isometric view of a typical residential house showing a truss assembly in which truss splice shoe of the present invention is used for different purposes at different locations.

In the FIG. 1 layout of a typical residential house, lumber roof trusses are indicated by 1, and the metallic, U-shaped plate of the present invention known as truss splice shoe is indicated by 2.

Figure 2:
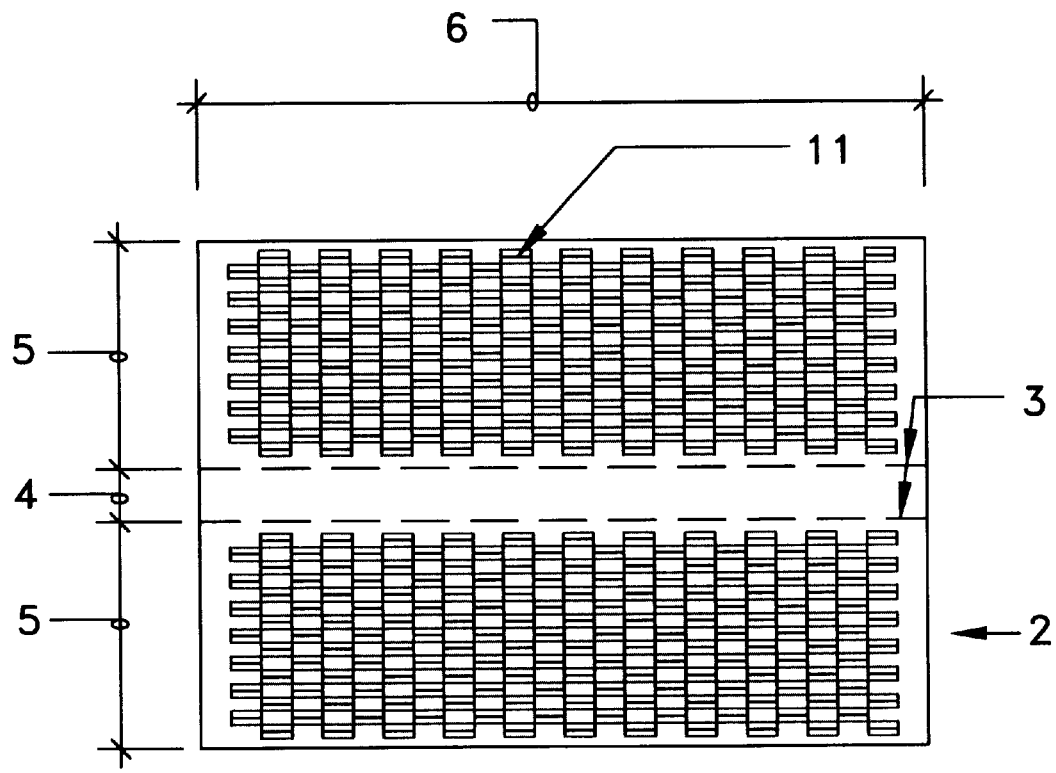
FIG. 2 depicts plan view of a truss splice shoe before bending into its final U-shape.

FIG. 2 depicts a truss splice shoe before bending to its final U-shape along lines 3. Numerals 4, 5 & 6 indicate dimensions that depend on the size of the truss member(s) to which the truss splice shoe is to be secured. The dimension indicated by 6 is always greater than the dimension indicated by 5 which means that the major axis of each sidewall is parallel to the bottom wall.

Figure 3:
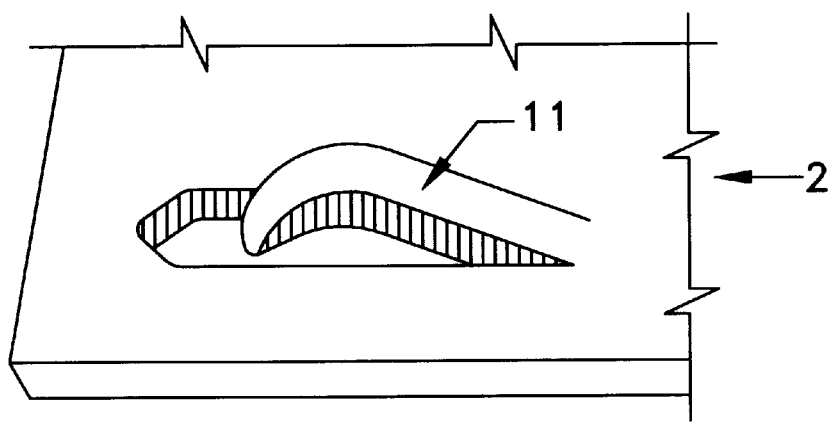
FIG. 3 is an isometric view of a unitary prong of the truss splice shoe.

The U-shaped truss splice shoe has unitary prongs formed in the sidewalls as means for attachment to truss members. The unitary prongs are indicated by 11 and the isometric view of a unitary prong is shown in FIG. 3. These unitary prongs are formed by dies through punching and bending operations. Each unitary prong has an elongated, curved portion tapering to a penetrating end. The penetrating ends are directed towards the surfaces of truss member(s) to which the truss splice shoe is to be secured. The extremities of the penetrating ends do not extend inside the space between the sidewalls. These unitary prongs eliminate the requirement for non-unitary fastening means such as nails.

In its final U-shape, the axes of the unitary prongs in each sidewall are substantially parallel to the plane of the bottom wall, with penetrating ends in either side of the minor axis of the sidewall being oriented towards the minor axis. Because of this particular configuration, the grip of a truss splice shoe over truss members increases upon application of load after installation. A considerably higher strength of any joint is obtained than if all the unitary prongs were struck from the sidewalls in the same direction. The arrangement of the unitary prongs is such that the sidewalls are essentially mirror images of each other.

Figure 4:
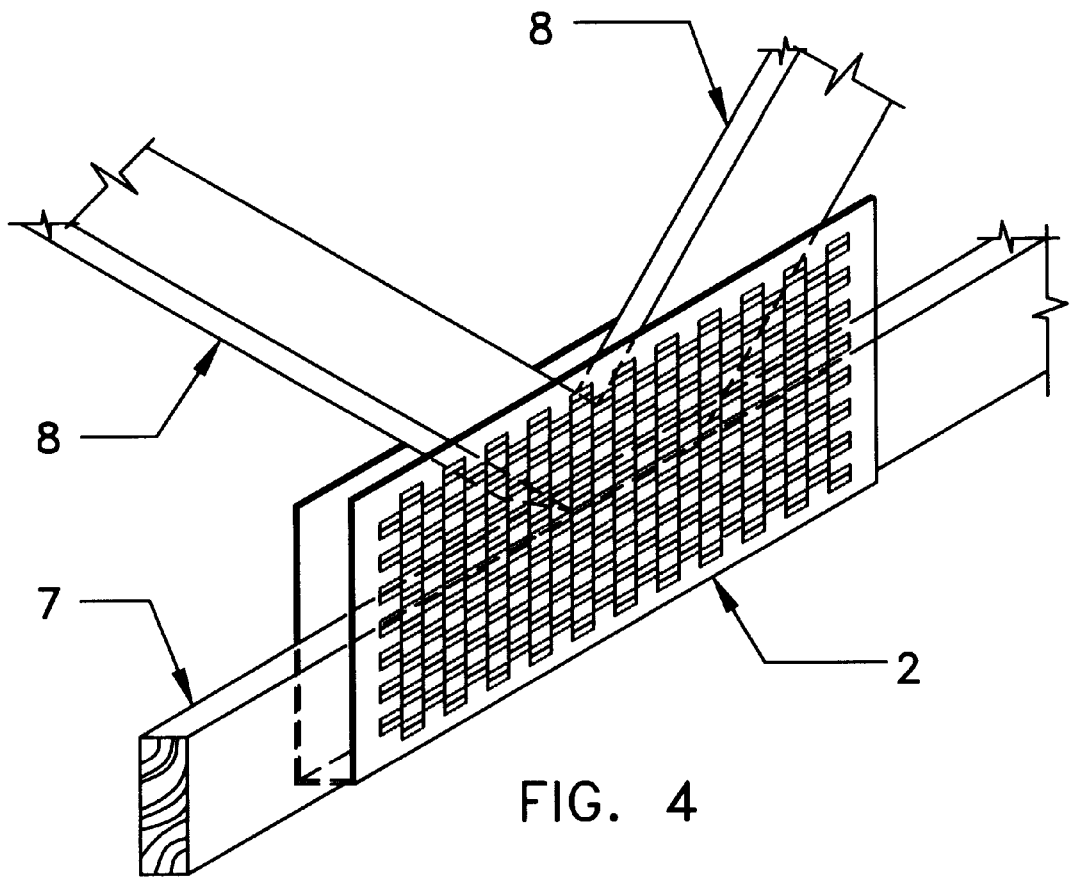
FIG. 4 is an isometric view illustrating details of attachment of a truss splice shoe for tying truss members meeting at a connection.

FIG. 4 indicates a chord 7 and web members 8 of a lumber truss being connected together using a truss splice shoe 2 to form a joint.

As the first step of attachment of the truss splice shoe at a connection, the bottom wall is arranged so that it becomes flush with a side surface of one of the truss members meeting at that connection ensuring that the ends of other truss members lie between the sidewalls substantially near the minor axes of the sidewalls. Thereafter, the unitary prongs in the sidewalls of the truss splice shoe are flattened with a mallet to ensure complete clasping on the truss member(s).

On account of its U-shape, the truss splice shoe provides ease in arranging the truss members between the sidewalls in the desired configuration before connection.

Trusses assembled by using separate metal plates on opposed directions at each joint, as in current practice, are vulnerable to loss of load-bearing capacity caused by any movement of truss members which may loosen embedded metal teeth. Loosening can take place due to lateral flexing of the trusses during transport, unloading, job-site handling and erection.

The truss splice shoe overcomes these drawbacks on account of the contiguous nature of the bottom wall and the sidewalls. The bottom wall provides rigidity by preventing any buckling or twisting of the sidewalls and the prongs, and is thus helpful in maintaining the prongs in an optimum anchoring position.

Figure 5:
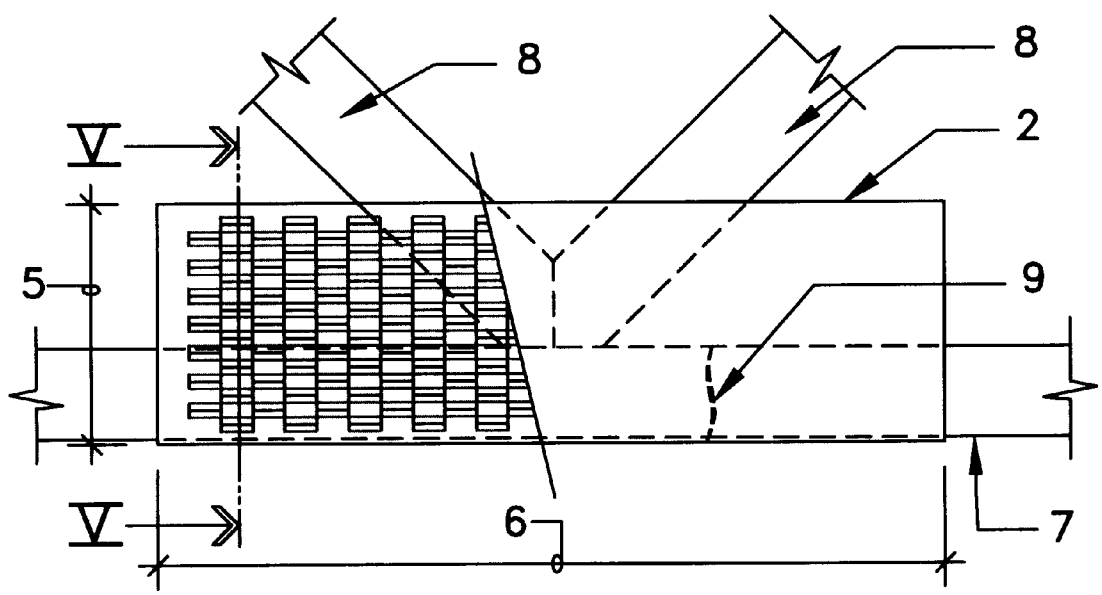
FIG. 5 is a side elevation view for describing the functioning of a truss splice shoe when used for repairing a distressed truss member.
Figure 6:
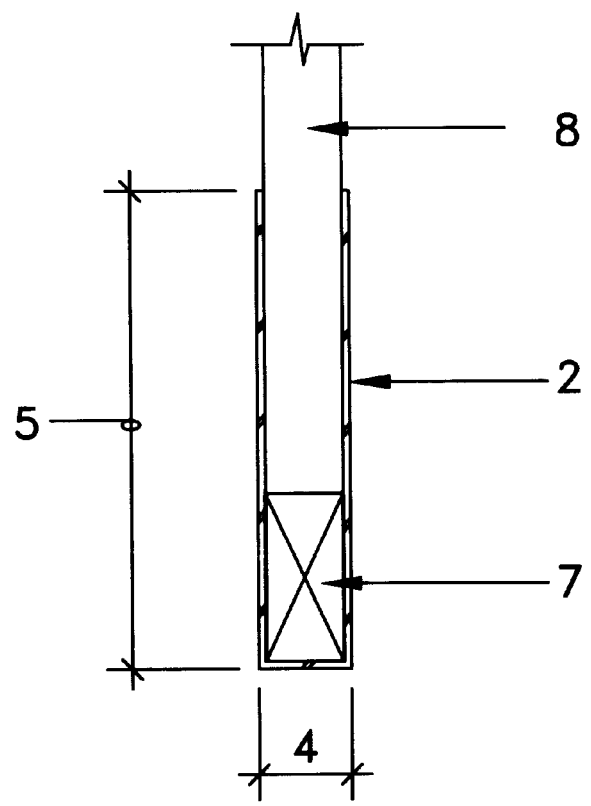
FIG. 6 is a cross-sectional view taken along line V—V of FIG. 5.

In case of connecting as well as repairing of a distressed truss member, orientation of the truss splice shoe 2 with respect to the line of distress 9 is depicted in FIG. 5. For a proper repair, effective transfer of stresses to the truss splice shoe is necessary. This is ensured by keeping the truss splice shoe free of unitary prongs or holes in the bottom wall along portion 4 as shown in FIG. 6, so that this portion resists tensile and shear stresses transmitted from the distressed truss member.

Figure 7:
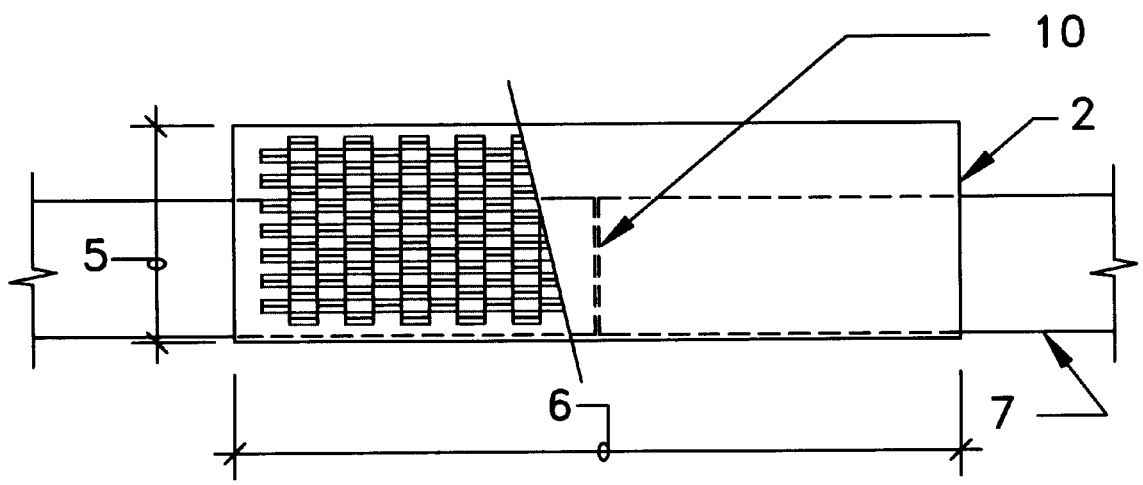
FIG. 7 is a side elevation view for describing the functioning of a truss splice shoe when used for providing a joint in a truss member.

FIG. 7 depicts an arrangement that uses a truss splice shoe to provide a joint 10 in a truss member. In this case also, stresses in the truss member are effectively transferred across the line of joint by means of the truss splice shoe which envelopes the member at the joint from three sides.

In case of repair of a distressed truss member or provision of a new joint in a truss member, the bottom wall of the truss splice shoe is brought into contact with the lower side surface of the truss member ensuring that the zone of distress or the joint lies substantially near the minor axes of the sidewalls.

Figure 8:
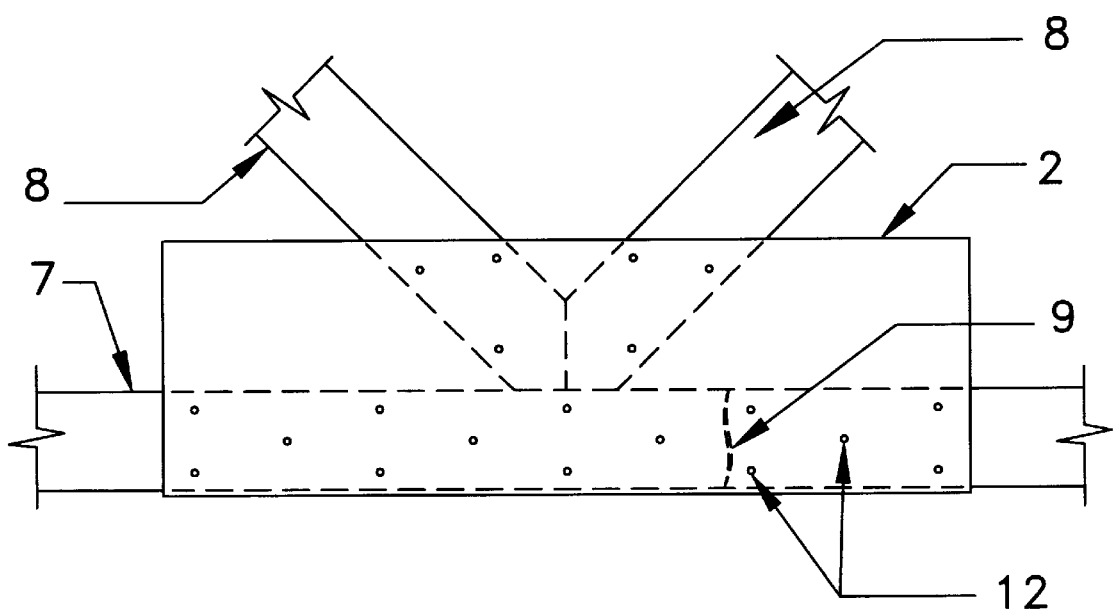
FIG. 8 is a side elevation view illustrating a modified form of the truss splice shoe secured to truss members using nails.

A modified form of the truss splice shoe has no unitary prongs and is secured to truss members using nails 12 at the locations of unitary prongs and is shown in FIG. 8.

While specific configurations have been set forth for the purpose of describing novel features of the invention, it should be recognized that such specifics can be varied by relying on the technology as taught, without departing from the principles of the invention. Therefore, in determining the scope of the present invention, reference should be made to the appended claims.

What is claimed is:

1. A truss splice shoe for connecting two or more truss members meeting at a joint of a lumber roof truss, said truss splice shoe comprising:

a bottom wall, two substantially parallel sidewalls connected to said bottom wall, and a plurality of unitary prongs provided in rows in both said sidewalls with each said unitary prong having an elongated, curved portion tapering to a penetrating end;

said bottom wall and said sidewalls forming a U-shaped cavity adapted for receiving sides of said truss members;

the penetrating ends of the prongs provided in one of said sidewalls extending towards the penetrating ends of the prongs provided in the other sidewall;

said curved portions and said penetrating ends of said prongs being located outside the U-shaped cavity formed by said bottom wall and said sidewalls, and said bottom wall being free of holes;

axes of said prongs being substantially parallel to the plane of said bottom wall.

2. A method of connecting a plurality of truss members comprising the steps of:

providing the truss splice shoe according to claim 1, aligning said bottom wall in flush contact with a side surface of one of said truss members, aligning ends of another of said truss members between the sidewalls of said shoe adjacent to said one of said truss members, and providing a force against said unitary prongs inserting said penetrating ends of said prongs into said truss members.

* * * * *